United States Patent
Han (10) Patent No.: US 9,193,029 B2
(45) Date of Patent: Nov. 24, 2015

(54) METHOD OF MANUFACTURING RETAINER RING FOR POLISHING WAFER

(71) Applicant: Sang Hyo Han, Gyeonggi-Do (KR)

(72) Inventor: Sang Hyo Han, Gyeonggi-Do (KR)

(*) Notice: Subject to any disclaimer, the term of this patent is extended or adjusted under 35 U.S.C. 154(b) by 255 days.

(21) Appl. No.: 14/070,588

(22) Filed: Nov. 4, 2013

(65) Prior Publication Data

US 2014/0123469 A1    May 8, 2014

(30) Foreign Application Priority Data

Nov. 5, 2012    (KR) ........................ 10-2012-0123904

(51) Int. Cl.
     *B24B 37/32*      (2012.01)
     *B29D 99/00*      (2010.01)

(52) U.S. Cl.
     CPC ............ *B24B 37/32* (2013.01); *B29D 99/0082* (2013.01); *Y10T 29/49948* (2015.01); *Y10T 29/49963* (2015.01)

(58) Field of Classification Search
     CPC .......... B24B 37/32; B24B 37/04; B24B 7/04; B24B 7/228; B24B 37/30; B24B 31/116; B24B 37/042; B24B 41/06; B24B 5/35; B24B 5/00; B24B 29/00; B29D 99/0082; Y10T 29/49963; Y10T 29/49948

See application file for complete search history.

(56) References Cited

U.S. PATENT DOCUMENTS 8,740,673 B2 * 6/2014 Kalenian ................ B24B 37/32
     451/285
2005/0208881 A1    9/2005   Wilkinson et al.

FOREIGN PATENT DOCUMENTS

| KR | 1020120015577 | 2/2012 |
| KR | 1020120095280 | 8/2012 |

* cited by examiner

*Primary Examiner* — David Bryant
*Assistant Examiner* — Lee A Holly
(74) *Attorney, Agent, or Firm* — Jianq Chyun IP Office (57) ABSTRACT

Provided are a retainer ring for polishing a wafer and a method of manufacturing the retainer ring, in which an outer circumferential surface of the wafer is retained during an operation of polishing a wafer by using a chemical mechanical polishing (CMP) method.
In detail, a retainer ring may be manufactured at relatively low costs.
In addition, a method of manufacturing a retainer ring for polishing a wafer, which may be produced at relatively low costs, may be provided.

14 Claims, 6 Drawing Sheets

METHOD OF MANUFACTURING RETAINER RING FOR POLISHING WAFER

CROSS-REFERENCE TO RELATED APPLICATIONS

This application claims the priority benefit of Korean application serial no. 10-2012-0123904, filed on Nov. 5, 2012. The entirety of the above-mentioned patent application is hereby incorporated by reference herein and made a part of this specification.

BACKGROUND

1. Field

One or more embodiments of the present invention relate to a method of manufacturing a retainer ring for polishing a wafer, and more particularly, to a method of manufacturing a retainer ring for retaining an outer circumferential surface of a wafer during a process of polishing a wafer by using a chemical mechanical polishing (CMP) method.

2. Description of the Related Art

The manufacture of a semiconductor device essentially includes a polishing process for planarizing a surface of a semiconductor wafer.

As the polishing process, a chemical mechanical polishing (CMP) method is mainly used. According to the CMP method, a surface of a wafer coated with tungsten or oxide or the like is polished by mechanical friction and also by using a chemical abrasive. In the CMP method, a wafer fixed to a carrier is pressed against a polishing pad and rotated so that a surface of the water is polished by friction between the polishing pad and the surface of the wafer. In addition, the surface of the wafer is chemically polished by a slurry which is supplied between the polishing pad and the wafer as a chemical abrasive.

Figure 1:
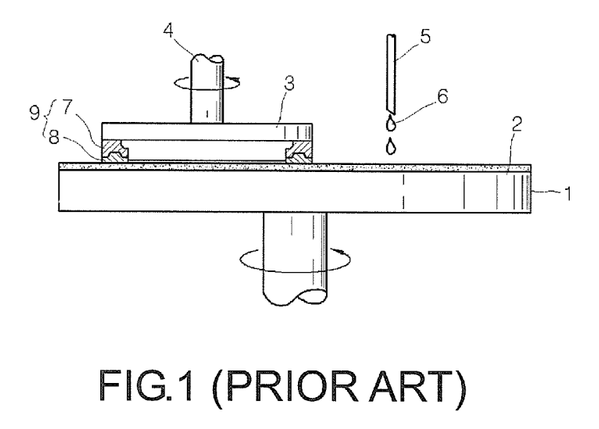
FIG. 1 is a schematic view to explain a process of polishing a wafer by using a chemical mechanical polishing (CMP) method.

FIG. 1 is a schematic view to explain a process of polishing a wafer by using a CMP method. A polishing pad 2 is installed on a turntable 1, and a wafer W is placed on the polishing pad 2. The wafer W is contacted to a lower surface of a carrier 3 that accommodates the wafer W, and then, the wafer W is supported by using a retainer ring 9 so that the wafer W is not separated from the carrier 3 which operates by using a driving unit 4, during polishing. By supplying a slurry 6, which is an abrasive, between the wafer W and the polishing pad 2 through a nozzle 5, while pressurizing the wafer W accommodated in the carrier 3 against the polishing pad 2 with a predetermined pressure, the wafer W is polished both chemically and mechanically by rotation of the polishing pad 2.

The retainer ring 9 for polishing a wafer, according to the conventional art, includes a frame ring 7 and a polishing ring 8. The frame ring 7 is formed of a metal, and the polishing ring 8 is formed of a synthetic resin material. The frame ring 7 and the polishing ring 8 are coupled to each other by using an adhesive. Referring to FIG. 1, the polishing ring 8 is rotated while being pressurized against the polishing pad 2, and is worn away together with the wafer W due to friction. That is, the polishing ring 8 is a consumable component which is worn away and is reduced in height when used for a long period of time. When the lifespan of the polishing ring 8 ends, the polishing ring 8 is cut away from the frame ring 7 by using a cutting tool, and another new polishing ring 8 is contacted to the frame ring 7 for use.

However, since the frame ring 7 and the polishing ring 8 are coupled to each other by using an adhesive, when cutting the polishing ring 8 from the frame ring 7 by using a cutting tool, not just the polishing ring 7 which is formed of a synthetic resin is cut but a portion of the frame ring 8 is also cut. Thus, when a polishing ring is replaced regarding a frame ring several times, dimensions and a shape of the frame ring are changed and the frame ring becomes unusable in the end. This shortens a replacement period of the frame ring, and the costs of the CMO method are also increased.

In addition, the frame ring 7 and the polishing ring 8 may be separated from each other as an adhesive force of the adhesive in the CMP process is weakened, and this may damage a wafer and cause a great loss in the CMP method.

In addition, a polishing ring is manufactured using a resin such as polyether ether ketone (PEEK), polyethylene (POM), polyphenylene sulfide (PPS), polyamide imide (PAI), or polyether imide (PEI), which are high-functional resins having resistance to polishing and are thus highly expensive. As a retainer ring is replaced although just a small portion of the polishing ring is worn, an expensive polishing ring resin is consumed unnecessarily, increasing the total manufacturing costs.

SUMMARY

One or more embodiments of the present invention include a method of manufacturing a retainer ring for polishing a wafer, in which a retainer ring may be manufactured at low costs while the function as a retainer ring is maintained.

Additional aspects will be set forth in part in the description which follows and, in part, will be apparent from the description, or may be learned by practice of the presented embodiments.

According to one or more embodiments of the present invention, a method of manufacturing a retainer ring for polishing a wafer, the retainer ring being installed on a carrier that closely contacts the wafer to a top surface of a polishing pad to retain the wafer, the method includes: (a) preparing a frame ring that is in the form of a circular ring, formed of a metal, and mounted to the carrier, wherein a plurality of coupling holes are formed in the frame ring; (b) after completing (a), screw-coupling a plurality of coupling members to the plurality of coupling holes of the frame ring such that an end portion of the plurality of coupling members, in which a male screw portion is formed, is exposed below the frame ring; (c) injection-molding a plurality of retaining members that are each in the form of an arc dividing a circumference of a circle corresponding to the frame ring and include a plurality of coupling grooves corresponding to the plurality of coupling holes of the frame ring, at corresponding positions; (d) after completing (a), (b), and (c), temporarily coupling the frame ring and the plurality of retaining members by inserting the end portion of the plurality of coupling members exposed below the frame ring, into the plurality of coupling grooves of the retaining members; (e) placing a coupled structure of the frame ring and the plurality of retaining members obtained after completing (d), in an injection mold; and (f) after performing (e), forming an intermediate member that couples the frame ring and the retaining members by using an insert injection method in which a melting resin is injected between the frame ring and the retaining members.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, the present invention will be described in detail with reference to the attached drawings.

Figure 2:
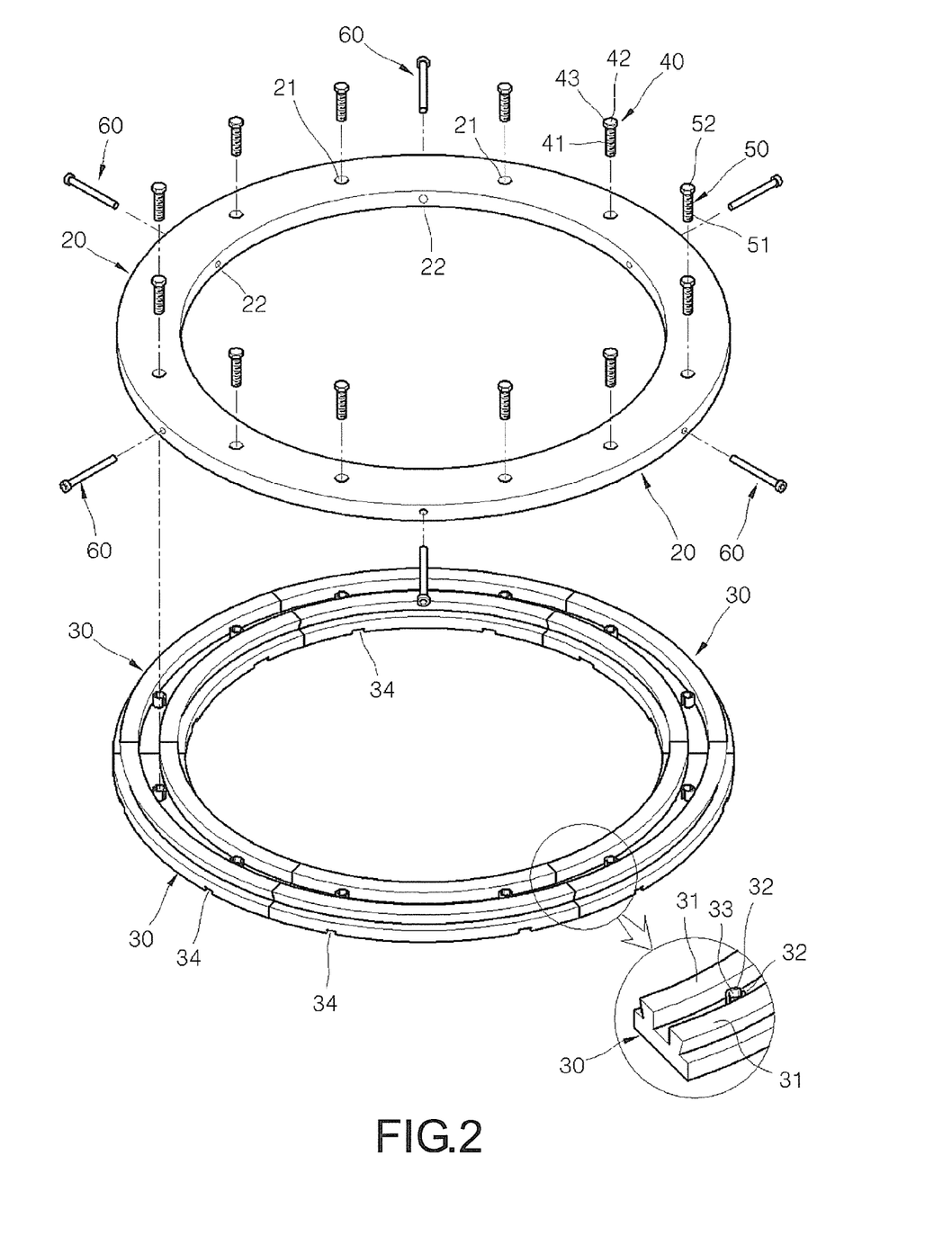
FIG. 2 is an exploded perspective view to explain a method of manufacturing a retainer ring for polishing a wafer according to an embodiment of the present invention.
Figure 3:
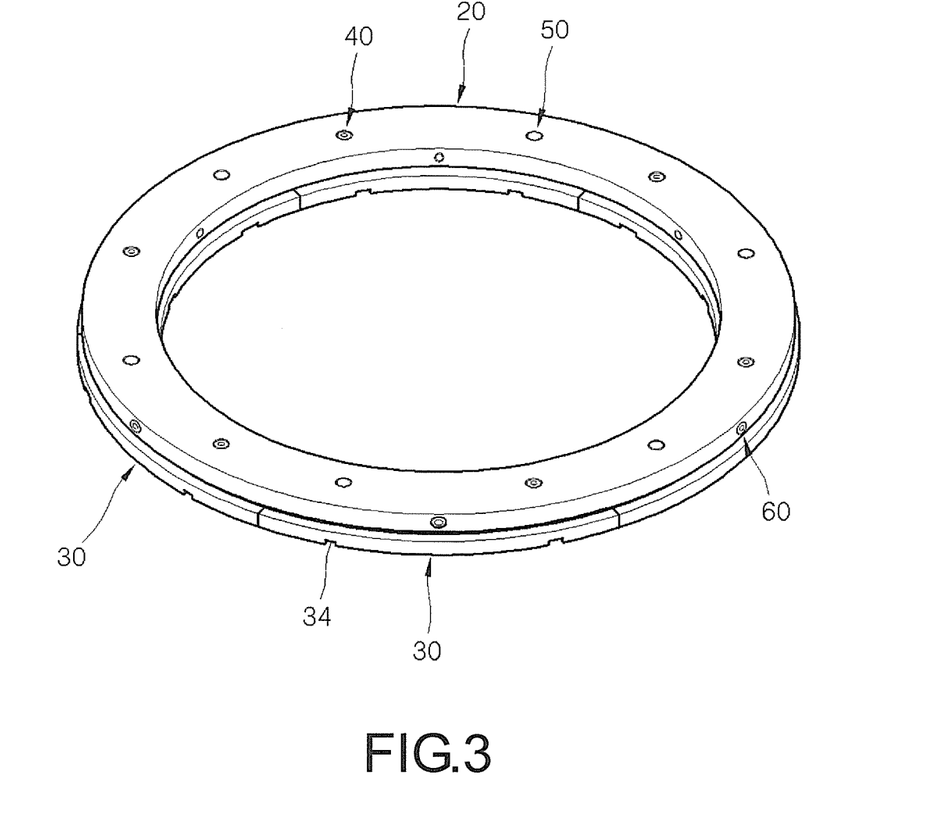
FIG. 3 is a perspective view illustrating the retainer ring for polishing a wafer, illustrated in FIG. 2, in an assembled state.

FIG. 2 is an exploded perspective view to explain a method of manufacturing a retainer ring for polishing a wafer according to an embodiment of the present invention. FIG. 3 is a perspective view illustrating the retainer ring for polishing a wafer, illustrated in FIG. 2, in an assembled state.

Referring to FIGS. 2 and 3, the retainer ring for polishing a wafer, which is manufactured by using a method of manufacturing a retainer ring for polishing a wafer, according to an embodiment of the present invention, includes a frame ring 20 and a plurality of retaining members 30.

First, referring to FIG. 2, the frame ring 20 that is in the form of a circular ring and is formed of a metal is prepared (operation (a)). The frame ring 20 according to the current embodiment of the present invention includes a plurality of coupling holes 21 in a circumferential direction. Twelve coupling holes 21 that are vertically passed through the frame ring 20 are formed in the frame ring 20. Female screws are formed in an inner surface of the coupling holes 21. The coupling holes 21 are arranged at predetermined intervals along the circumferential direction of the frame ring 20.

Next, as illustrated in FIG. 2, coupling members 40 and 50 are screw-coupled to the coupling holes 21 of the frame ring 20 such that end portions of the coupling member 40 and 50, in which male screw portions 41 and 51 are respectively formed, are exposed below the frame ring 20 (operation (b)).

According to the current embodiment of the present invention, two types of coupling members 40 and 50, that is, a nut-type coupling member 40 and a bolt-type coupling member 50 are used. The nut-type coupling members 40 and the bolt-type coupling members 50 both vertically extend and respectively comprise the male screw portions 41 and 51 in lower portions thereof, and are screw-coupled to the coupling holes 21 of the frame ring 20 so that the end portions of the coupling members 40 and 50 are exposed below the frame ring 20. The nut-type coupling members 40 and the bolt-type coupling members 50 respectively include coupling heads 43 and 52 having a greater outer diameter than the male screw portions 41 and 51 so as to limit a coupling depth thereof with respect to the frame ring 20. The coupling heads 43 and 52 of the nut-type coupling members 40 and the bolt-type coupling members 50 have a hexagonal outer diameter such that the coupling heads 43 and 52 may be tightened or untightened with respect to the coupling holes 21 of the frame ring 20 by rotating the coupling heads 43 and 52 by using a hexagonal wrench. Here, the coupling heads 43 and 52 of the nut-type coupling members 40 and the bolt-type coupling members 50 each having a hexagonal outer diameter will be described.

Meanwhile, the nut-type coupling members 40 is in the form of a cylinder or a container. A female screw portion 42 is formed in an inner surface of the nut-type coupling members 40. The frame ring 20 is fixed to the CMP apparatus as a carrier of a CMP apparatus and the female screw portion 42 of the nut-type coupling members 40 are tightened via a bolt.

According to the current embodiment of the present invention, as illustrated in FIG. 2, the nut-type coupling members 40 and the bolt-type coupling members 50 are alternately inserted into the coupling holes 21 in the circumferential direction of the frame ring 20 to be tightened. The coupling members 40 and 50 are tightened until the coupling heads 43 and 52 are flush with a top surface of the frame ring 20.

Next, the plurality of retaining members 30 that are each in the form of an arc dividing a circumference of a circle corresponding to the frame ring 20 are injection-molded (operation (c)). A plurality of coupling grooves 33 are formed in the retaining members 30, respectively. In detail, the end portions of the coupling members 40 and 50 that are exposed below the frame ring 20 may be inserted into the coupling grooves 33.

According to the current embodiment of the present invention, the retaining members 30 each having a shape of an arc that is one sixth of a circumference along the circumferential direction are used. A slurry groove 34 through which slurry used in polishing a wafer may be discharged to the outside is formed in a lower surface of the retaining members 30.

Figure 5:
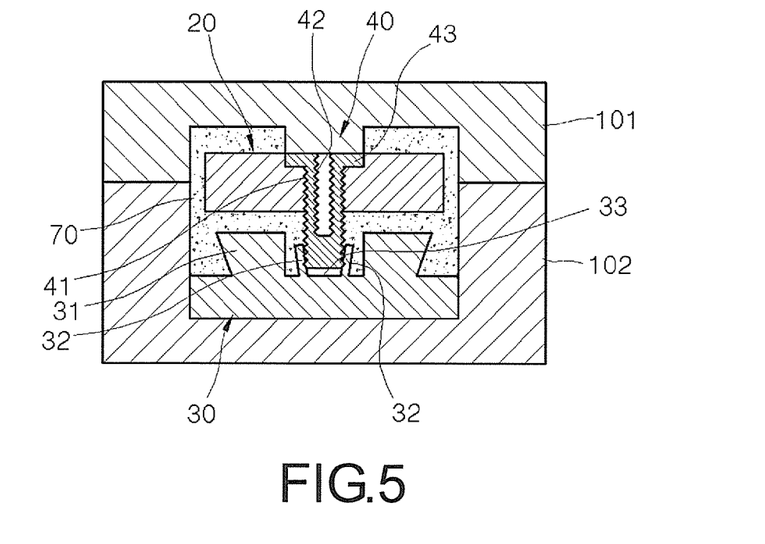
FIG. 5 is a cross-sectional view illustrating a retainer ring for polishing a wafer, illustrated in FIG. 4, in an injection mold, cut along a line V-V.
Figure 6:
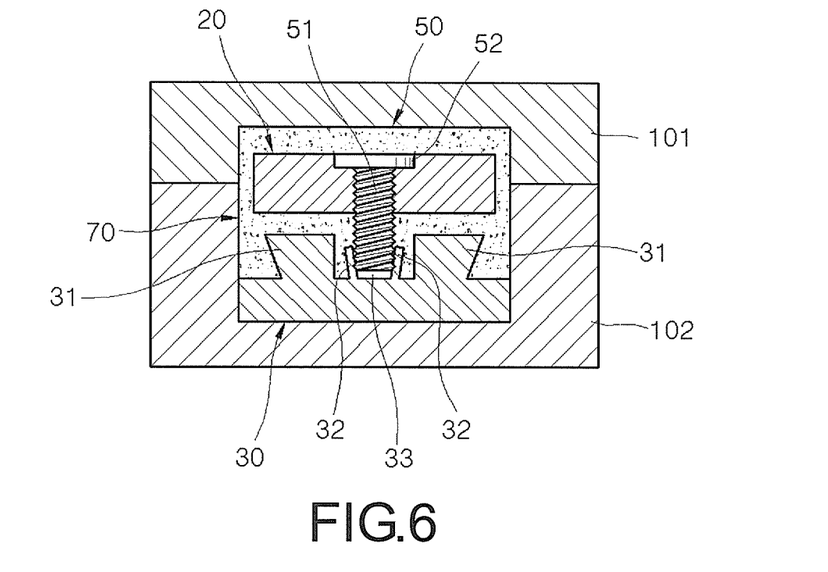
FIG. 6 is a cross-sectional view illustrating a retainer ring for polishing a wafer, illustrated in FIG. 4, in an injection mold, cut along a line VI-VI.

A pair of protrusions 31 are formed on a top surface of the retaining members 30. As illustrated in FIG. 3, the pair of protrusions 31 are protruded in two rows toward the frame ring 20 in the circumferential direction. The coupling protrusions 31 have a trapezoidal cross-section, as illustrated in FIGS. 5 and 6, so as to improve a coupling force thereof with respect to an intermediate member 70, which will be described later. That is, the coupling protrusions 31 have a width increasing toward the frame ring 20. When the six retaining members 30 are disposed to face the frame ring 20, the retaining members 30 may contact one another as illustrated in FIG. 2, or may be spaced apart from one another. According to circumstances, the frame ring 20 and the retaining members 30 may be insert injected by using the retaining members 30 that are formed to be in contact with one another, and then, space between the retaining members 30 may be cut to form grooves.

The coupling grooves 33 are formed between the coupling protrusions 31 of the retaining members 30. According to the current embodiment of the present invention, the six retaining members 30 are used, and the coupling grooves 33 are formed at positions corresponding to the coupling members 40 and 50 for the retaining members 30, respectively. The coupling grooves 33 may have various structures into which the end portions of the coupling members 40 and 50 may be inserted. The coupling grooves 33 according to the current embodiment of the present invention are each formed of a pair of ribs 32 that protrude to face the frame ring 20. The end portions of the coupling members 40 and 50 may be caught inside an inner portion of the coupling grooves 33 to maintain a gap between the frame ring 20 and the retaining members 30, or the coupling grooves 33 may have a deeper depth than the gap.

The retaining members 30 as described above may be formed of a resin such as polyether ether ketone (PEEK), polyethylene (POM), polyphenylene sulfide (PPS), polyamide imide (PAI), or polyetherimide (PEI). The above-described synthetic resins are to have excellent resistance to abrasion, and thus, high-quality resins are used as these resins. Consequently, compared to other typical synthetic resins, the price thereof is relatively high. When the polishing ring 8 is injection-molded to a circular ring as described above with reference to FIG. 1 by using the high-cost material, the manufacturing costs are necessarily high. As a large-size injection mold has to be provided to injection-mold the polishing ring 8 of a large circular shape, the manufacturing costs are increased. In addition, in order to injection-mold the polishing ring 8 having a large size as described above, a plurality of runners and a plurality of sprues are to be provided in the entire injection mold so that a melting resin may easily flow. In this case, resins in the runners and the sprues have to be discharged. Since the size of the injection mold is large, a large amount of resins of the runners and the sprues has to be discharged, and this causes an increase in the total manufacturing costs.

However, when the polishing ring 8 is formed of the retaining members 30 which are six, segmented portions as in the current embodiment of the present invention, a size of each of the retaining members 30 is reduced, and thus, the manufacturing costs may also be easily reduced.

Next, by using the frame ring 20 and the retaining members 30 configured as described above, the frame ring 20 and the retaining members 30 are temporarily coupled (operation (d)). As the coupling members 40 and 50 coupled to the frame ring 20 are inserted into the coupling grooves 33 of the retaining members 30, the frame ring 20 and the retaining members 30 are coupled to each other as illustrated in FIG. 3. As the coupling grooves 33 are each formed of the two ribs 32 disposed to face each other, as described above, the male screw portions 41 and 51 of the coupling members 40 and 50 enter the coupling grooves 33 while elastically deforming the ribs 32, and the frame ring 20 and the retaining members 30 are coupled to each other with a relatively small coupling force due to the elastic restorative force of the ribs 32. An uneven structure of the male screw portions 41 and 51 formed in the coupling members 40 and 50 also partially improves a coupling force with respect to the coupling grooves 33.

Figure 7:
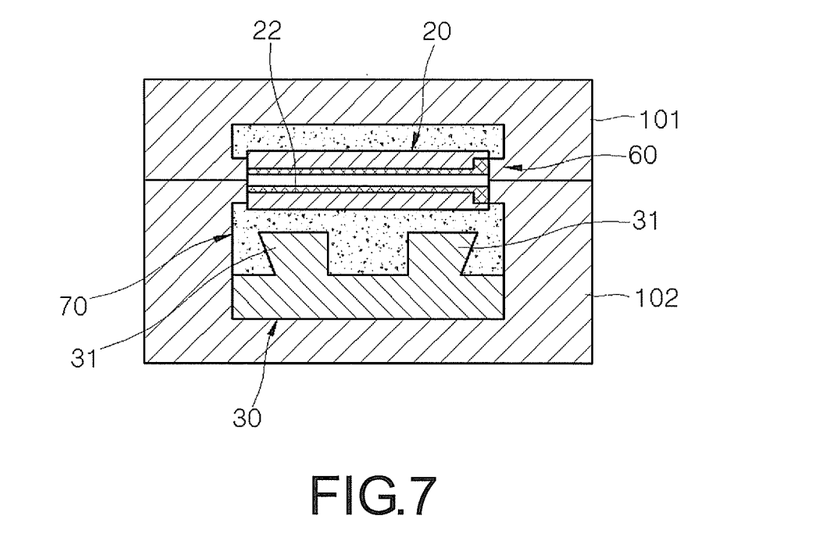
FIG. 7 is a cross-sectional view illustrating a retainer ring for polishing a wafer, illustrated in FIG. 4, in an injection mold, cut along a line VII-VII.

Meanwhile, a plurality of through holes 22 are formed in the frame ring 20 formed in operation (a), at predetermined intervals along a radius direction. According to the current embodiment of the present invention, a total of six through holes 22 are formed to pass through the frame ring 20 in a radius direction. The number of the through holes 22 may be varied according to necessity. A hollow member 60 is inserted into the frame ring 20 having the above-described form (operation (g)). The hollow member 60 has a cylindrical shape. Referring to FIG. 7, after polishing a wafer by using the retainer ring manufactured by using the method of manufacturing a retainer ring for polishing a wafer, according to the current embodiment of the present invention, a washing solution may be sprayed through the hollow member 60 to cleanse the slurry generated when the wafer is being polished. Operation (g) may also be performed before coupling the frame ring 20 and the retaining members 30.

While the frame ring 20 and the retaining members 30 are temporarily coupled to each other as described above, a coupled structure of the frame ring 20 and the plurality of retaining members 30 are placed inside injection molds 101 and 102 (operation (e)).

Figure 4:
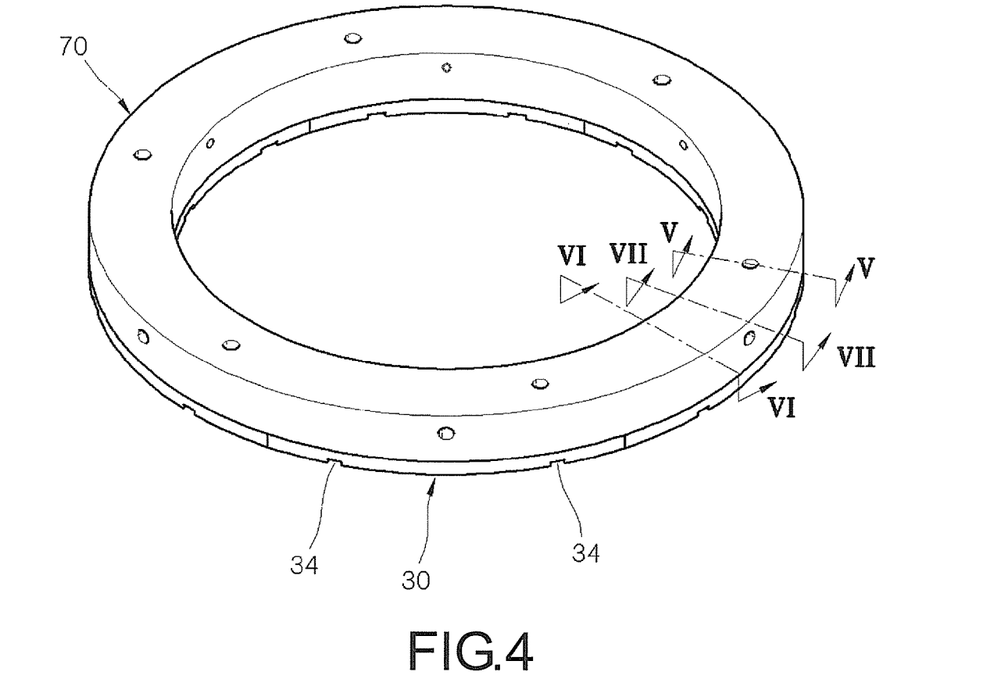
FIG. 4 is a perspective view illustrating the retainer ring for polishing a wafer, illustrated in FIG. 2, in a state completed by insert injection.

Next, the frame ring 20 and the retaining members 30 are coupled to each other by using an insert injection method in which a melting resin is injected between the frame ring 20 and the retaining members 30 (operation (f)). The frame ring 20 and the retaining members 30 are coupled to each other as the melting resin is cooled. As a result, a retainer ring for polishing a wafer as illustrated in FIG. 4 is completed.

The intermediate member 70 may be formed of a resin that is relatively less expensive than the material of the retaining member 30, such as poly butylene terephthalate (PBT), polycarbonate (PC), PPS, or acrylonitrile-butadiene-styrene (ABS).

The frame ring 20 and the retaining members 30 are closely contacted to inner walls of the injection molds 101 and 102 via by a pressure that is transferred to a melting resin in a cavity of the injection molds 101 and 102, and the intermediate member 70 is formed between the frame ring 20 and the retaining members 30. Even if a distance between the frame ring 20 and the retaining members 30 is not accurately retained when the frame ring 20 and the retaining members 30 are temporarily coupled, once the melting resin is filled in the injection molds 101 and 102 in operation (f), the frame ring 20 and the retaining members 30 are closely contacted to the inner walls of the injection molds 101 and 102 by a pressure of the melting resin, thereby accurately retaining the distance between the frame ring 20 and the retaining members 30.

Due to the uneven structure of the male screw portions 41 and 51 of the coupling members 40 and 50, the intermediate member 70 and the frame ring 20 are firmly coupled to each other. In other words, the intermediate member 70 and the frame ring 20 are firmly coupled due to the trapezoidal structure of the coupling protrusions 31 of the retaining members 30. As a result, the frame ring 20 and the retaining members 30 are firmly coupled.

As the frame ring 20 and the retaining members 30 are temporarily coupled in operation (d), and the coupled structure is placed in the injection molds 101 and 102 in operation (e), and then the intermediate member 70 is formed by injection molding in operation (f), as described above, productivity of the method of manufacturing a retainer ring may be improved. When the retaining members 30 having an arc shape are used as in the current embodiment of the present invention, if the frame ring 20 and the retaining members 30 are not temporarily coupled, each of the retaining members 30 (the six retaining members 30 in the current embodiment) has to be individually placed in the injection molds 101 and 102. This process is highly difficult and is not easily automated. Furthermore, it is difficult to accurately maintain relative positions of the frame ring 20 and the retaining members 30 in the injection molds 101 and 102. However, according to the current embodiment of the present invention, when the frame ring 20 and the retaining members 30 are temporarily coupled outside the injection molds 101 and 102 and then inserted into the injection molds 101 and 102 at a time, the overall manufacturing process is simplified, and productivity thereof increased, resulting in a reduction in the manufacturing costs. In particular, by allowing the frame ring 20 and the retaining members 30 to be engaged with each other via the coupling members 40 and 50 and the coupling holes 21, the frame ring 20 and the retaining members 30 may be inserted into the injection molds 101 and 102 while the relative positions of the frame ring 20 and the retaining members 30 are fixed to a predetermined extent (particularly, the relative positions of the frame ring 20 and the retaining members 30 in a circumferential direction). Thus, operations (e) and (f) may be efficiently performed.

The retainer ring for polishing a wafer, as completed as described above, is installed on a carrier and used in a CMP method. As described above, the retainer ring for polishing a wafer is installed on the carrier by using the female screw portion 42 of the nut-type coupling members 40.

When the retainer ring for polishing a wafer is used for a predetermined period of time, a lower portion of the retaining members 30 is worn and the lifetime thereof finally ends. The retainer ring whose lifetime is ended may be recycled in a manner as described below for reuse.

While the frame ring 20 is fixed, a machine tool may be used to cut portions of the intermediate member 70 and the frame ring 20 (operation (h)).

Referring to FIGS. 5 and 6, when a portion of the intermediate member 70 is cut, the coupling members 40 and 50 and the coupling heads 43 and 52 are exposed to the outside. Then, in this state, the frame ring 20 is untightened by rotating the coupling members 40 and 50 (operation (j)). While the coupling members 40 and 50 and the intermediate member 70 are coupled to each other via the uneven structure of the male screw portions 41 and 51 of the coupling members 40 and 50, the coupling members 40 and 50 may be easily separated from the intermediate member 70 by rotating the coupling members 40 and 50.

Next, remaining portions of the intermediate member 70 and the retaining members 30 attached to the frame ring 20 are removed (operation (j)). After removing the coupling members 40 and 50, as the intermediate member 70 and the frame ring 20 are in surface contact, it is easy to remove the intermediate member 70 and the retaining members 30 from the frame ring 20.

Unlike the frame ring 20 which is formed of a metal, the intermediate member 70 and the retaining members 30 are formed of a synthetic resin, and thus, the intermediate member 70 and the retaining members 30 may be removed relatively easily by cutting. The intermediate member 70 and the retaining members 30 do not have to be completely cut using a machine tool but may be cut to finally have a thickness of about 0.3 mm or less, and then the remaining portions may be easily removed manually. As the intermediate member 70 and the retaining members 30 are coupled to the frame ring 20 not by using an adhesive but via coupling structures such as the coupling members 40 and 50 and the coupling protrusions 31, the intermediate member 70 and the retaining members 30 may be easily separated from each other by cutting portions around the lower surface of the frame ring 20. Also, according to this method, the intermediate member 70 and the retaining members 30 may be removed without damaging the frame ring 20 at all. Thus, the frame ring 20 may be easily recycled.

Then, the frame ring 20 may be recycled by performing operations (b), (c), (d), (e), and (f) again with respect to the frame ring 20, from which the intermediate member 70 and the retaining members 30 are removed.

The retainer ring for polishing a wafer may be easily manufactured by reusing the frame ring 20 without any damage to the frame ring 20 in regard to a structure thereof as described above. Thus, the overall manufacturing costs of the retainer ring for polishing a wafer may be remarkably reduced.

The retainer ring for polishing a wafer is to have a preset height according to the standards for retainer rings. However, when a usage life span of the retainer ring is ended, the actual height of the retaining members 30 that is worn is only a small portion of the entire retaining members 30. Thus, as in the current embodiment of the present invention, by forming the intermediate member 70 using a material that is less expensive than the material of the retaining members 30, the manufacturing costs may be remarkably reduced. By forming the intermediate member 70 using a material less expensive than that of the retaining members 30 and filling space between the frame ring 20 and the retaining members 30, the total height of the retainer ring for polishing a wafer may be the same as that of a retainer ring according to the conventional art, but the manufacturing costs thereof may be reduced.

Hereinafter, a method of manufacturing a retainer ring for polishing a wafer according to another embodiment of the present invention will be described with reference to FIG. 8.

Figure 8:
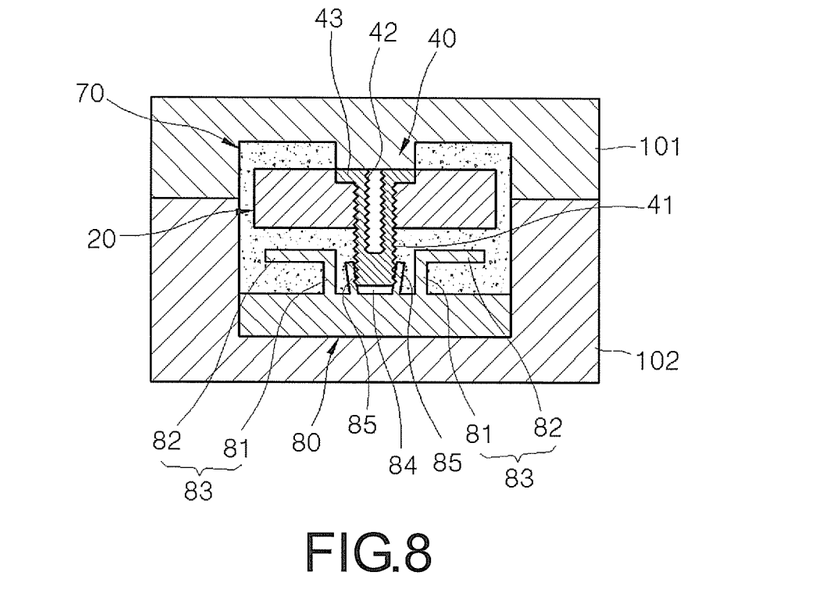
FIG. 8 is a cross-sectional view to explain a method of manufacturing a retainer ring for polishing a wafer according to another embodiment of the present invention.

Referring to FIG. 8, the method of manufacturing the retainer ring for polishing a wafer of the current embodiment of the present invention is different from the retainer ring manufactured according to the embodiment described with reference to FIGS. 2 through 7 in regard to a structure of a retaining member 80 that is formed by injection molding in operation (c).

In detail, the method of manufacturing the retainer ring for polishing a wafer of the current embodiment of the present invention is different from the method of manufacturing the retainer ring for polishing a wafer described above with reference to FIGS. 2 through 7 in that a coupling protrusion 83 of the retaining member 80 formed in operation (c) has a structure as illustrated in FIG. 8.

The coupling protrusion 83 of the retaining member 80 includes a vertical portion 81 and a horizontal portion 82. The vertical portion 81 extends toward a frame ring 20, and the horizontal portion 82 extends from the vertical portion 81 in a radius direction of the frame ring 20. According to circumstances, a plurality of horizontal portions 82 may be formed at the vertical portion 81. The coupling protrusion 83 also extends in two rows in a circumferential direction, and a coupling groove 84 is disposed between the coupling protrusions 83. The coupling groove 84 is formed of two ribs 85.

According to the structure of the coupling protrusion 83, a coupling force between the intermediate member 70 and the retaining member 80 may be improved.

The frame ring 20, the coupling members 40 and 50, and the hollow member 60 have the same structures as those described with reference to the method of manufacturing a retainer ring for polishing a wafer described above with reference to FIGS. 2 through 7.

Next, a method of manufacturing a retainer ring for polishing a wafer according to another embodiment of the present invention will be described with reference to FIG. 9.

The method of manufacturing a retainer ring for polishing a wafer of the current embodiment of the present invention is different from the methods of manufacturing a retainer ring for polishing a wafer, described above with reference to FIGS. 2 through 7 and FIG. 8 in regard to an operation of temporarily coupling a frame ring 120 and a retaining member 130.

In operation (a), an insertion groove 121 is formed in a lower surface of the frame ring 120.

In operation (c), a retaining member 130 is injection-molded such that an insertion protrusion 132 which may be inserted into the insertion groove 121 of the frame ring 120 is formed. A coupling protrusion 131 is formed in the retaining member 130.

As a method of fixing the insertion protrusion 132 of the retaining member 130 by inserting the insertion protrusion 132 into the insertion groove 121 of the frame ring 120 as formed as above, operation (d) of temporarily coupling the frame ring 120 and the retaining member 130 is performed.

In operation (e), a coupling structure of the frame ring 120 and the retaining member 130 obtained after performing operation (d) is placed in an injection mold, and then, in operation (f), an intermediate member 170 is formed by using an insert injection method.

An injection mold for performing operation (f) is configured such that a fixed hole 171 is formed by using the intermediate member 170. After operation (f) is completed, a helical coil 180 is inserted into the fixed hole 171 (operation (k)). By inserting the fixed hole 171 into the helical coil 180, a female screw portion is formed in the fixed hole 171. By screw-coupling a female screw portion in the helical coil 180, the retainer ring manufactured according to the method of the current embodiment of the present invention is fixed with respect to a carrier.

While the present invention has been particularly shown and described with reference to exemplary embodiments thereof, the exemplary embodiments should be considered not for purposes of limitation.

For example, it will be understood by those of ordinary skill in the art that while the retaining members 30 described above comprise six portions, a circumference may also be divided into equal portions of various numbers. Accordingly, the number of retaining members and the number of coupling members may also be varied. The number of coupling holes may also be various according to designs.

In addition, a structure of the coupling members 40 and 50 coupled to the frame ring 20 may also be varied besides the bolt-type coupling members 50 and the nut-type coupling members 40. While the bolt-type coupling members 50 and the nut-type coupling members 40 are both used in the above-described embodiment of the present invention, only one of the bolt-type coupling members 50 and the nut-type coupling members 40 may be used. When only the bolt-type coupling members 50 is used, an additional element for coupling the frame ring 20 and a carrier (for example, a coupling hole in which a female screw portion is formed) may be provided.

In addition, while the coupling groove formed of a pair of ribs is described above, the coupling groove may have other various structures. For example, a coupling groove having a concave container shape may be formed in a retaining member, and an end portion of a coupling members may be inserted into the coupling groove. According to circumstances, a female screw portion may be formed in an inner surface of the coupling groove, and a male screw portion of the coupling members may be screw-coupled to the coupling groove.

In addition, while operation (f) is performed after the hollow member 60 is inserted into the frame ring 20, the retainer ring for polishing a wafer may also be manufactured without using the hollow member 60.

Figure 9:
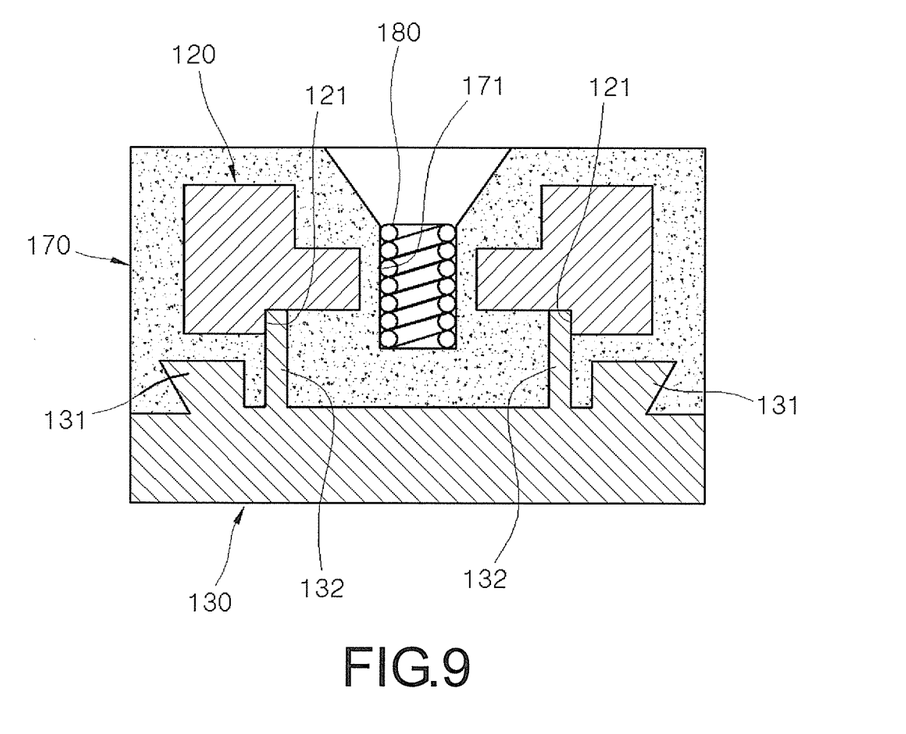
FIG. 9 is a view to explain a method of manufacturing a retainer ring for polishing a wafer according to another embodiment of the present invention.

In addition, while the insertion groove 121 is formed in the frame ring 120 and the insertion protrusion 132 is formed in the retaining member 130 according to the embodiment of FIG. 9, in a reverse manner, an insertion protrusion may be formed in the frame ring 120, and an insertion groove may be formed in the retaining member 130.

In addition, while the helical coil 180 is inserted into the fixed hole 171 formed in the intermediate member 170 in the embodiment of FIG. 9, instead of inserting a helical coil, a bolt may be screw-coupled to the fixed hole 171 to couple a carrier and a retainer ring.

As described above, according to the one or more of the above embodiments of the present invention, a method of manufacturing a retainer ring for polishing a wafer, at low costs, may be provided.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A method of manufacturing a retainer ring for polishing a wafer, the retainer ring being installed on a carrier that closely contacts the wafer to a top surface of a polishing pad to retain the wafer, the method comprising:
   (a) preparing a frame ring that is in the form of a circular ring, formed of a metal, and mounted to the carrier, wherein a plurality of coupling holes are formed in the frame ring;
   (b) after completing (a), screw-coupling a plurality of coupling members to the plurality of coupling holes of the frame ring such that an end portion of the plurality of coupling members, in which a male screw portion is formed, is exposed below the frame ring;
   (c) injection-molding a plurality of retaining members that are each in the form of an arc dividing a circumference of a circle corresponding to the frame ring and include a plurality of coupling grooves corresponding to the plurality of coupling holes of the frame ring, at corresponding positions;
   (d) after completing (a), (b), and (c), temporarily coupling the frame ring and the plurality of retaining members by inserting the end portion of the plurality of coupling members exposed below the frame ring, into the plurality of coupling grooves of the retaining members;
   (e) placing a coupled structure of the frame ring and the plurality of retaining members obtained after completing (d), in an injection mold; and
   (f) after performing (e), forming an intermediate member that couples the frame ring and the retaining members by using an insert injection method in which a melting resin is injected between the frame ring and the retaining members.

2. The method of claim 1, wherein at least a part of the coupling members is a nut-type coupling member that is formed in the form of a cylinder or container, and includes a female screw portion via which the coupling member is coupled to the carrier and a male screw portion on an outer portion of the coupling member.

3. The method of claim 1, wherein the coupling members comprise a coupling head having a greater outer diameter than the male screw portion so as to limit a coupling depth with respect to the frame ring.

4. The method of claim 1, wherein the coupling members comprise a coupling head having a greater outer diameter than the male screw portion so as to limit a coupling depth with respect to the frame ring,
   wherein the coupling head of the coupling members has a structure in which coupling of the coupling members with respect to the frame ring is released by using a wrench.

5. The method of claim 1, wherein the plurality of coupling grooves of the retaining members are formed of a plurality of ribs that are protruded to face the frame ring.

6. The method of claim 1, wherein the plurality of retaining members comprise a coupling protrusion protruding to face the frame ring.

7. The method of claim 1, wherein the plurality of retaining members comprise a coupling protrusion protruding to face the frame ring, wherein the coupling protrusion of the retaining members extends in two rows in a circumferential direction, with the coupling grooves therebetween, and a width of the coupling protrusion increases toward the frame ring.

8. The method of claim 1, wherein the retaining members comprise a coupling protrusion protruding to face the frame ring, wherein the coupling protrusion of the retaining members comprises a vertical portion that extends toward the frame ring and a horizontal portion that extends from the vertical portion in a radius direction of the frame ring.

9. The method of claim 1, further comprising, before performing (f), (g) inserting a hollow member having a cylinder form, into a through hole formed at predetermined intervals, to pass through the through hole in a radius direction along a lateral side of the frame ring.

10. The method of claim 1, comprising:

(h) cutting portions of the intermediate member and the retaining members using a machine tool after using the retainer ring completed in (f);

(i) removing remaining portions of the intermediate member and the retaining members attached to the frame ring; and performing (d), (e), (f), and (b) again to recycle the frame ring.

11. The method of claim 10, comprising, after performing (h), (j) untightening the coupling members from the frame ring by rotating the coupling members;

performing (i); and performing (c), (b), (d), (e), and (f) again to recycle the frame ring.

12. The method of claim 1, wherein in (a) and (c), the frame ring and the retaining members are respectively formed such that an insertion protrusion is formed in one of the frame ring and the retaining members, and an insertion groove, into which the insertion protrusion is inserted, is formed in the other of the frame ring and the retaining members, and wherein in (d), the frame ring and the plurality of retaining members are temporarily coupled by inserting the insertion protrusion into the insertion groove.

13. The method of claim 12, wherein in (f), a fixed hole for coupling the intermediate member to the carrier is formed in the intermediate member.

14. The method of claim 13, further comprising (k) inserting a helical coil into the fixed hole of the intermediate member to form a female screw portion in the fixed hole of the intermediate member formed in (f).

* * * * *